United States Patent [19]

Hasegawa

[11] Patent Number: 4,503,733
[45] Date of Patent: Mar. 12, 1985

[54] CREEP PHENOMENON PREVENTIVE DEVICE FOR AUTOMATIC TRANSMISSION GEAR TYPE AUTOMOBILE

[76] Inventor: Masao Hasegawa, 4474 Toyooka, Ryuyo-cho, Iwata-gun, Shizuoka-ken, Japan

[21] Appl. No.: 425,627

[22] Filed: Sep. 28, 1982

[30] Foreign Application Priority Data

Nov. 5, 1981 [JP] Japan .................. 56-178024

[51] Int. Cl.$^3$ ............................................. B60K 41/18
[52] U.S. Cl. ........................................ 74/865; 74/866
[58] Field of Search ................. 74/865, 866, DIG. 11; 192/3.59, 0.092

[56] References Cited

U.S. PATENT DOCUMENTS

| | | | |
|---|---|---|---|
| 2,566,519 | 9/1951 | Farkas | 74/867 |
| 2,924,995 | 2/1960 | Hubert et al. | 74/DIG. 11 |
| 3,890,856 | 6/1975 | Miyauchi et al. | 74/869 |
| 4,046,032 | 9/1977 | Braun et al. | 74/877 |
| 4,373,409 | 2/1983 | Benedek et al. | 74/329 |

FOREIGN PATENT DOCUMENTS 0063046 5/1980 Japan ......................... 74/866

Primary Examiner—George H. Krizmanich
Assistant Examiner—Dirk Wright
Attorney, Agent, or Firm—Holman & Stern

[57] ABSTRACT

A creep prevention device for automatic transmission type automobiles comprises electric switches operated by the speed meter and accelerator pedal electrically connected in a circuit with two valve actuators which operate valves controlling operation of the fluid pressure lines in the hydraulic circuit of the transmission so that when the accelerator pedal is released to allow the engine to idle, the brake pedal is operated and the pointer of the speed meter returns to its zero position, the switches are switched "ON", actuating the magnetic valves and thereby switching the hydraulic oil flow from the hydraulic control system for the forward and reverse clutches to disengage them and set the transmission in neutral, regardless of the setting of the shift lever, thus interrupting the transmission of the engine drive shaft rotation and keeping the automobile at a standstill.

2 Claims, 1 Drawing Figure

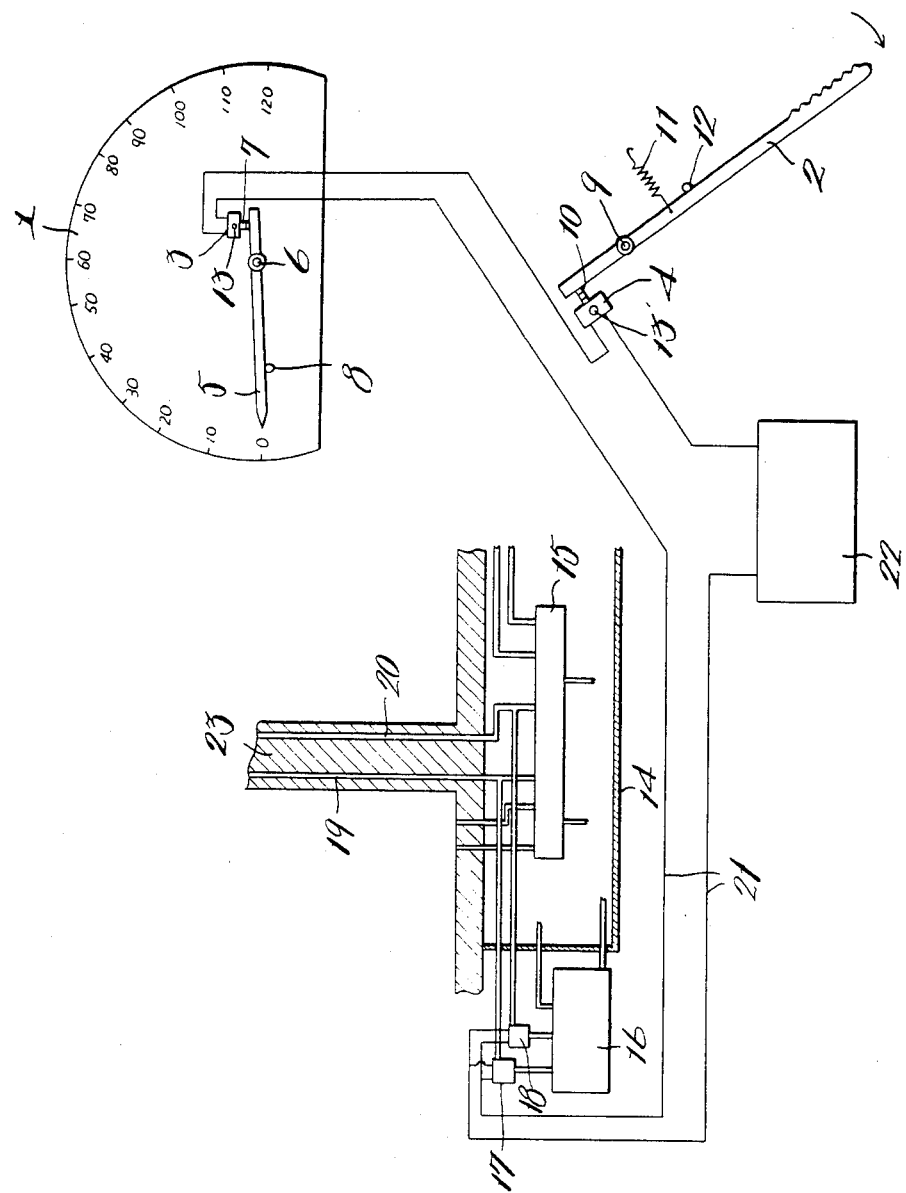

CREEP PHENOMENON PREVENTIVE DEVICE FOR AUTOMATIC TRANSMISSION GEAR TYPE AUTOMOBILE

BACKGROUND OF THE INVENTION

Field of the Invention

This invention relates to a device for automatic transmission type automobile which may be utilized to prevent what is called a creep phenomenon that occurs when the engine is idling and the brake is released, causing the automobile to move by a slight transmission of the engine drive shaft rotation to the driving wheels.

Description of the Prior Art

An automatic transmission is a device which can change rotation of the engine transmitted through a torque converter into appropriate speeds automatically to correspond to various operating sequences. Because the device requires the driver only to operate the accelerator pedal and brake for start-up, steady run and stop, the driver can enjoy very convenient driving without cumbersome operation of the clutch pedal or shift lever which is repeatedly required with the traditional friction clutch and standard manual gear shift type automobile. The device is however, deffitient in that even though the engine speed is reduced to slow, the automobile inevitably begins to move slowly if the shift lever is kept engaged in a driving position and the brake is released, thereby requiring the driver to operate the foot or side brake to keep the automobile at a standstill, or change the shift lever into neutral position to interrupt transmission of the engine rotation to the driving wheels. In addition, the driver must release the brake or return the shift lever into original position for start-up after short stops.

Unless the automobile is kept braked to avoid the sliding effect of the torque converter with the shift lever in driving position, the creep phenomenon takes place. This phenomenon is a common inevitable shortcoming with automatic transmission type automobiles.

There are several known methods to solve this problem such as a foot pedal type side brake for ease of operation, or an electric transmission gear to allow changing into third speed prior to stop. The latter is employed for the purpose of providing a larger load to the engine and thereby making the automobile more difficult to move, whereas in the ordinary automatic transmission type automobile the gear ratio is changed to the 1st speed immediately before stopping. These known methods, however, are not satisfactorily effective. The creep phenomenon not only sacrifices the convenience of driving with an automatic transmission, but also provides a greater chance of accident since it takes place so quietly and slowly as to be unnoticed by the driver.

SUMMARY OF THE INVENTION

The object of the present invention is to provide an automatic transmission gear which may change the transmission range into neutral and simultaneously interrupt the transmission of engine power for short stops, thereby eliminating the need of inconvenient operations and dangerous accidents caused by creep phenomenon.

In accordance with the present invention, a novel device is provided which makes the automobile free from the chance of creep phenomenon without any mechanical shortcoming considered inevitable so far.

The novel device allows the driver to perform every operational sequence from start-up to stop simply through the control of the accelerator pedal and brake pedal once the shift lever is set into the driving range, greatly increasing safety and convenience in the driving of automatic transmission type automobiles.

BRIEF DESCRIPTION OF THE DRAWING

The invention will now be described in detail with reference to the accompanying FIGURE of the drawing which is a schematic view of a creep phenomenon preventive device for use in automatic transmission type automobiles according to the present invention.

DETAILED DESCRIPTION

In general, an ordinary automatic transmission is built with a mechanism for transmitting rotation of the engine drive shaft to the planetary gear a torque converter, by four control elements which are adjusted by the hydraulic control system to obtain an appropriate gear ratio, namely either the forward or reverse clutch is engaged for advancing or backing, and both clutches are disengaged in the neutral position. In an embodiment according to the present invention magnetic valves are provided in the hydraulic oil pipes for the forward and reverse clutches, thereby making it possible when stopping the automobile to switch over the flow of hydraulic oil and automatically change the gear into neutral position. Refering now to the FIGURE, numeral 1 indicates a speed meter having a pointer 5 which rotates about pointer shaft 6. Numeral 2 indicates an accelerator pedal interlocking with electric switches 3 and 4. Shroud ring 7 is projected from the end of said pointer 5 oppositely to the electric switch 3. Stud 8 is provided on the meter 1 face to keep the zero point position for the pointer 5. Numeral 9 indicates a pedal shaft for the accelerator pedal. Shroud ring 10 is projected from the pedal oppositely to the electric switch 4. Numeral 11 indicates a return spring for the accelerator pedal. Stud 12 is provided to keep the said pedal 2 in place when returning to idle. Adjusting screws 13 and 13' of the said electric switches 3 and 4, respectively, are adjusted so that the shrouds 7 and 10 switch the switches 3 and 4 to "ON" by pushing corresponding switch buttons on the switches when the speed meter 1 and the accelerator pedal 2 return to the zero position and idling position respectively. Hydraulic control system 14, control valve 15 and oil pan 16 are shown at the left of the FIGURE. Magnetic valves 17 and 18 are provided in the hydraulic oil pipes 19 and 20, respectively, which allow hydraulic control of the forward and reverse clutches (not illustrated) of the planetary gear. These valves diverge hydraulic pressure from the control valve 15 of the hydraulic system to the oil pan 16. Conductor 21 links electric switches 3 and 4 to the magnetic valves 17 and 18 and also the battery 22 in series, valves 17 and 18 being in parallel with respect to each other. Numeral 23 indicates a center support for the planetary gear.

If a driver removes his foot off the accelerator pedal while driving to bring the engine to idle for a short stop, followed by actuation of the brake pedal, the automobile comes to a stop and simultaneously pointer 5 of the speed meter 11 returns to its zero position. Because the accelerator pedal simulatneously returns to a position where it comes into contact with the stud 12 by force of return spring 11, electric switches 3 and 4 are switched to "ON" allowing the electric current to flow from the battery 22 and actuate both magnetic valves 17 and 18. Hydraulic oil pipes through which hydraulic control system 14 governs the function of the forward and reverse clutches for the planetary gears are switched over to disengage both clutches and change the gear ratio to neutral regardless of the position of the shift lever and thereby the transmission of engine power is interrupted with a result of complete standstill of the automobile. When the accelerator pedal 2 is depressed for re-start after the short stop, electric switch 4 is switched to "OFF" and the magnetic valves are deactuated to stop functioning thereby producing a simultaneous switch over of the hydraulic oil pipes, whereupon the automobile starts running in the original transmission range. As the driving speed is accelerated, pointer 5 of the speed meter 1 lifts off the zero position and as a result the electric switch 3 is switched to "OFF", which means that there is no chance of the magnetic valves being actuated even when the accelerator pedal 2 returns to an idling position and the electric switch 4 is "ON" while driving.

I claim:

1. A creep preventing system for automatic transmission type automobiles having an accelerator pedal, speed meter, forward and reverse clutches, planetary gear, and hydraulic fluid control circuits to operate the clutches comprising:

an electric switch mounted in position to be closed by the accelerator pedal when said pedal is in an idle position;
an electric switch mounted in position to be closed by the speed meter when said speed meter is in the zero position;
a reservoir for the hydraulic fluid;
an electromagnetically operated valve operatively connected between the fluid control circuit for the forward clutch and said reservoir to bypass fluid pressure in said fluid circuit to said reservoir when actuated;
an electromagnetically operated valve operatively connected between the fluid control circuit for the reverse clutch and said reservoir to bypass fluid pressure in said reverse clutch fluid circuit to said reservoir when actuated;
a source of electrical power;
an electric valve circuit operatively connecting said electromagnetic valves in parallel; and
an electric circuit operatively connecting said switches, power source and electric valve circuit in series; so that when said accelerator pedal is in the idle position and said speed meter is in the zero position said switches close said electrical circuits to actuate said valves.

2. A creep preventing system as claimed in claim 1 wherein:
said speed meter has a rotating pointer; and
said switches are limit switches engageable by protruding elements on said pointer and accelerator pedal respectively.

* * * * *